Jan. 10, 1967 M. R. RIEK 3,297,903

THREADED JOINT FOR ARC CARBONS

Filed Oct. 18, 1963

INVENTOR.
MARVIN R. RIEK
BY

ATTORNEY

United States Patent Office 3,297,903
Patented Jan. 10, 1967

3,297,903
THREADED JOINT FOR ARC CARBONS
Marvin R. Riek, Fostoria, Ohio, assignor to Union
Carbide Corporation, a corporation of New York
Filed Oct. 18, 1963, Ser. No. 317,340
7 Claims. (Cl. 313—355)

This invention concerns a means by which arc carbons can be joined end-to-end to form an assembly of arc carbons suitable for use in an arc lamp, and particularly concerns a threaded joint for arc carbons.

In many applications, such as movie projection and solar simulation, arc carbons need to be joined together in an end-to-end relationship to provide an assembly of arc carbons which may be fed into an arc. The technique of joining arc carbons into a longer assembly both provides continuous operation over longer periods of time, and eliminates short stubs of burned electrodes which ordinarily remain in the electrode jaws and which must be thrown away.

The best previously known method for joining arc carbons is to dispose carbonizable cement in the joint between two joined carbons and then bake the cement to form a permanent bond. This method requires a special baking unit ordinarily, and frequently causes gumming of the electrode jaws with exuded resin from the joint during baking.

The principal object of the invention therefore is to provide a new means of joining arc carbons end-to-end to form an electrode assembly of longer length.

Broadly, the above object is achieved by an arc carbon electrode adapted to be joined with another arc carbon electrode to form an assembly of electrodes suitable for use in an arc lamp. The arc carbon electrode is provided with a socket in one end, a plug on the other end which is shaped to fit the socket, and mating threads on the plug and in the socket and having a particular number of turns per linear inch of carbon.

Figure 1:
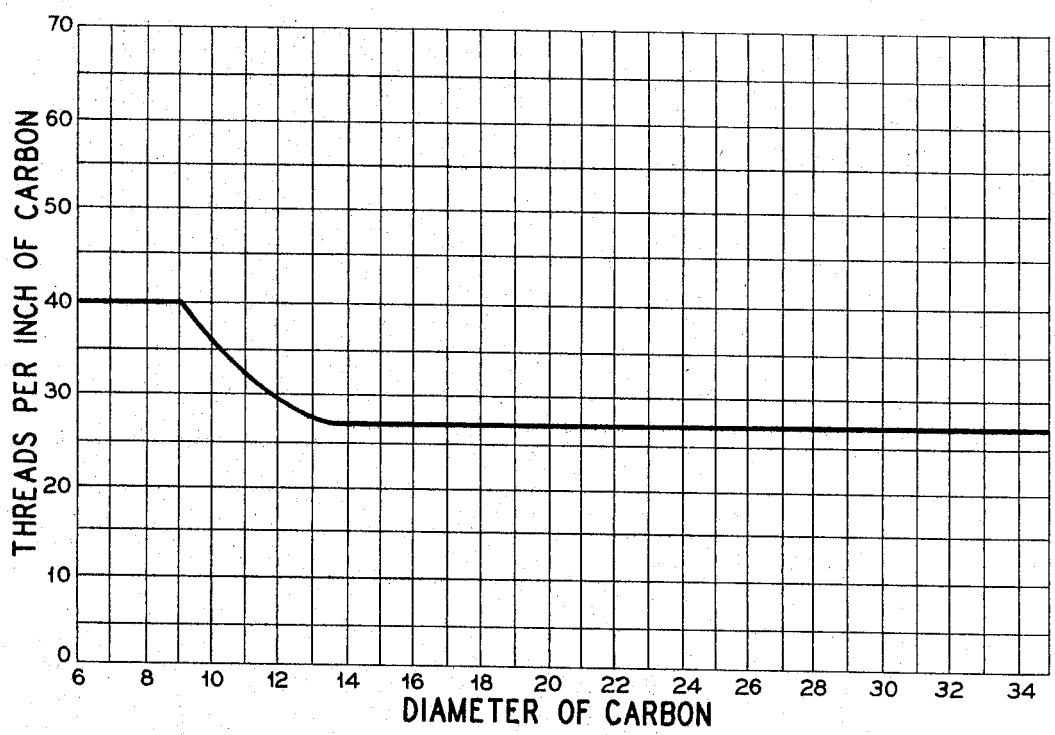
FIG. 1 is a graph illustrating an essential feature of the invention.

It was found that in order to provide a threaded joint in arc carbons, especially positive arc carbons which have a thin shell around a core comprising flame material, fine threads must be employed to effect a satisfactory joint. As shown in FIG. 1, the number of threads which may be employed for a given diameter of arc carbon must be at least the number which falls on the curve or line. For example, fine threads of a size shown in FIG. 1 do not tend to chip during machining whereas coarser threads chip and thereby cause hot spots and serve current and voltage fluctuations during burning of a joint in an arc. Furthermore, if the threads in the joint have the number of turns per linear inch as shown in FIG. 1, there is little or no loss of carbon fragments during joint burn-through. When coarser threads are employed in the joint, fragments up to $\frac{1}{16}$ inch in length frequently drop off during joint burn-through and frequently damage the optical system.

A typical example of the performance of a threaded joint having relatively coarse threads and a threaded joint in accordance with the invention is shown below in Table I, wherein the duration of disturbance refers to the deviation of light, current, and voltage from that normally encountered for the arc carbon when a joint is not being burned.

TABLE I.—PERFORMANCE OF COARSE THREADED JOINT WITH THREADED JOINT OF INVENTION

| Carbon Diameter, mm. | Threads Per Inch | Fragment Loss | Duration of Disturbances, min. |
|---|---|---|---|
| 13.6 | 27 | None | 2.0-2.5 |
| 13.6 | 14 | $\frac{1}{16}$" ring | 4.5 |

Figure 2:
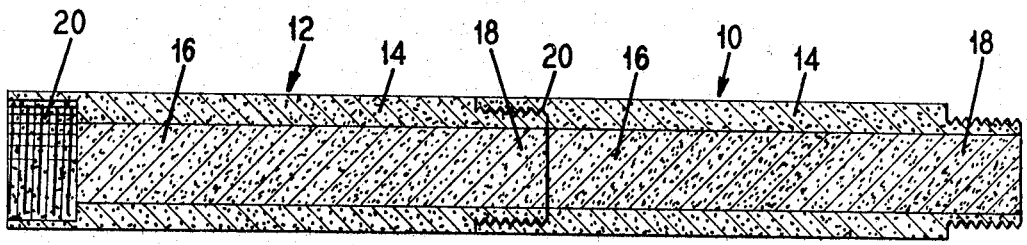
FIG. 2 is a sectional view of an electrode assembly in accordance with the invention.

The carbon electrode assembly shown in FIG. 2, which embodies the principles of the invention, comprises an electrode 10 joined to another electrode 12 in end-to-end relationship. Each of the electrodes 10 and 12 comprises a shell 14 with a core 16 therein which includes a flame material. As used herein, a flame material is a material which becomes highly luminescent upon excitation by electrons in an arc. Such materials include the oxides and fluorides of the rare earth metals such as cerium, but may also be materials such as thorium, iron, nickel, cobalt, manganese, strontium, calcium, and vanadium. Compounds other than oxides and fluorides of the rare earth metals may also be employed and such techniques are known in the art. The core 16 is principally composed of a carbonaceous material and a flame material, and is usually made by extruding the core mix into the desired shape and then baking the mix according to conventional procedures. The shell 14 is usually composed principally of a carbonaceous material, such as graphite, and may be made by mixing a carbonaceous material with suitable binders, extruding the mix in the form of a shell, and baking the shell in accordance with conventional procedures. The core 16 is then inserted in the baked shell with a suitable binder thereabout to form the final arc carbon electrode.

Each of the electrodes 10 and 12 have a plug 18 on one end and a socket 20 in the other end which is shaped to receive the plug 18. The plug 18 and socket 20 are also threaded with mating threads. As shown in FIGURE 2, the threads on the plug 18 and in the socket 20 are located in the shell 14 along a center line about equidistant between the two sides of the shell 14. This is a preferred construction since the core 16 is ordinarily not strong enough to withstand the threading process or the pressures incurred in the joint. Furthermore, only certain sizes of threads may be employed in the joint if a good joint is expected. The number of threads per inch which must be employed for a given diameter of arc carbon is shown in Table II.

TABLE II.—JOINT DIMENSIONS FOR VARIOUS SIZE CARBONS

| Carbon Diameter, mm. | Number of Threads Per Linear Inch | Joint Size, inches | Single Thread Depth, inches |
|---|---|---|---|
| 7 | 40 | $\frac{7}{32}$ | .016 |
| 8 | 40 | $\frac{15}{64}$ | .016 |
| 9 | 40 | $\frac{9}{32}$ | .016 |
| 10 | 36 | $\frac{5}{16}$ | .018 |
| 11 | 32 | $1\frac{1}{32}$ | .020 |
| 13.6 | 27 | $\frac{7}{16}$ | .024 |
| 16 | 27 | $\frac{9}{16}$ | |

The threads referred to herein are standard pipe threads and may be machined on the plug or in the socket by the use of conventional taps and dies. Finer threads than those listed in Table II may also be employed for a given diameter of arc carbon; therefore, for diameters other than those listed in Table II, the number of threads per inch on or above the line in the graph of FIG. 1 for a given diameter or arc carbon will provide a satisfactory joint as long as there is sufficient thread depth to prevent slippage in the joint. As pointed out previously, if coarses threads are employed, fragments of carbons frequently break off during joint burn-through and chipping of the carbon occurs during machining.

In general, for arc carbons having a diameter of between about 6 millimeters and up to about 30 to 35 millimeters, the threads should be of a size between about 40 and about 27 threads per inch, that is, turns per linear inch of carbon, and should have at least the number of threads which fall on a straight line connecting the points 40 threads per inch at 6 millimeters and 40 threads per inch at 9 millimeters; a smooth curve connecting the points 40 threads per inch at 9 millimeters, 36 threads per inch at 10 millimeters, 32 threads per inch at 11 millimeters, and 27 threads per inch at 13.6 millimeters; and a straight line connecting the points 27 threads per inch at 13.6 millimeters and 27 threads per inch at about 35 millimeters.

In general, good performance has been obtained with carbons joined by threads as described above with the plug ranging in length between about 3/16 inch and 1/2 inch. It is preferable to have the shells of adjacent carbons shoulder at the joint to ensure a smooth burn-through during operation.

I claim:

1. An arc carbon electrode adapted to be joined with another arc carbon electrode to form an assembly of electrodes suitable for use in an arc lamp, said electrode having a socket in one end, a plug on the other end which is shaped to fit in said socket, and mating threads disposed on said plug and in said socket, said threads having between 40 and 27 turns per linear inch and having at least the number of threads falling on the following lines in a graph showing the number of threads per linear inch against the diameter of said arc carbon electrode: a straight line connecting the points 40 threads per inch at a 7 millimeter diameter and 40 threads per inch at a 9 millimeter diameter, a smooth curve connecting the points 40 threads per inch at 9 millimeters, 36 threads per inch at 10 millimeters, 32 threads per inch at 11 millimeters, and 27 threads per inch at 13.6 millimeters, and a straight line connecting the points 27 threads per inch at 13.6 millimeters and 27 threads per inch at 35 millimeters.

2. An assembly of carbon electrodes suitable for use in an arc lamp, said assembly comprising a first carbon electrode having a socket in the end, a second carbon electrode having a plug on one end which fits in said socket, and mutually engaging threads on said plug and in said socket, said threads having between 40 and 27 turns per linear inch and having at least the number of threads falling on the following lines in a graph showing the number of threads per linear inch against the diameter of said arc carbon electrode: a straight line connecting the points 40 threads per inch at a 7 millimeter diameter and 40 threads per inch at a 9 millimeter diameter, a smooth curve connecting the points 40 threads per inch at 9 millimeters, 36 threads per inch at 10 millimeters, 32 threads per inch at 11 millimeters, and 27 threads per inch at 13.6 millimeters, and a straight line connecting the points 27 threads per inch at 13.6 millimeters and 27 threads per inch at 35 millimeters.

3. A positive arc carbon electrode having an external diameter of 9 millimeters and adapted to be joined with another arc carbon electrode to form an assembly of electrodes suitable for use in an arc lamp, said electrode having a socket in one end, a plug on the other end which is shaped to fit in said socket, and mating threads in said socket and on said plug, said threads being standard pipe threads and having at least 40 turns per linear inch.

4. A positive arc carbon electrode having an external diameter of 10 millimeters and adapted to be joined with another arc carbon electrode to form an assembly of electrodes suitable for use in an arc lamp, said electrode having a socket in one end, a plug on the other end which is shaped to fit in said socket, and mating threads in said socket and on said plug, said threads being standard pipe threads and having at least 36 turns per linear inch.

5. A positive arc carbon electrode having an external diameter of 11 millimeters and adapted to be joined with another arc carbon electrode to form an assembly of electrodes suitable for use in an arc lamp, said electrode having a socket in one end, a plug on the other end which is shaped to fit in said socket, and mating threads in said socket and on said plug, said threads being standard pipe threads and having at least 32 turns per linear inch.

6. A positive arc carbon electrode having an external diameter of 13.6 millimeters and adapted to be joined with another arc carbon electrode to form an assembly of electrodes suitable for use in an arc lamp, said electrode having a socket in one end, a plug on the other end which is shaped to fit in said socket, and mating threads in said socket and on said plug, said threads being standard pipe threads and having at least 27 turns per linear inch.

7. A positive arc carbon electrode having an external diameter of 16 millimeters and adapted to be joined with another arc carbon electrode to form an assembly of electrodes suitable for use in an arc lamp, said electrode having a socket in one end, a plug on the other end which is shaped to fit in said socket, and mating threads in said socket and on said plug, said threads being standard pipe trreads and having at least 27 turns per linear inch.

No references cited.

JOHN W. HUCKERT, *Primary Examiner.*

A. J. JAMES, *Assistant Examiner.*